United States Patent [19]

Irelan

[11] Patent Number: 4,463,982

[45] Date of Patent: Aug. 7, 1984

[54] RETRACTABLE EXTENSION FOR A RECREATIONAL VEHICLE

[75] Inventor: John A. Irelan, Elkhart, Ind.

[73] Assignee: Coachmen Industries, Inc., Middlebury, Ind.

[21] Appl. No.: 397,130

[22] Filed: Jul. 12, 1982

[51] Int. Cl.³ ............................................. B60P 3/34
[52] U.S. Cl. ..................................... 296/170; 296/27
[58] Field of Search ................. 296/170, 171, 173, 27; 52/66

[56] References Cited

U.S. PATENT DOCUMENTS

| | | | |
|---|---|---|---|
| 3,429,608 | 2/1969 | Farnum | 296/173 |
| 3,463,538 | 8/1969 | Koon | 296/173 |
| 3,632,153 | 1/1972 | Knudsen | 296/169 |
| 3,709,551 | 1/1973 | McCarthy | 296/170 |
| 3,941,414 | 3/1976 | Platt | 296/170 |

Primary Examiner—Robert R. Song
Attorney, Agent, or Firm—James D. Hall

[57] ABSTRACT

Retractable extension for a recreational vehicle including two side wall panels, an end panel and a roof panel. Each panel is of solid construction with the wall panels pivoting on a base panel to a horizontal folded position, the end panel has a compound sliding and pivoting connection with the roof panel and both are jointly folded from in-use position to horizontal position. The stacked panels are then telescoped within a recreational vehicle.

3 Claims, 9 Drawing Figures

Fig. 5

RETRACTABLE EXTENSION FOR A RECREATIONAL VEHICLE

DESCRIPTION

1. Field of the Invention

This invention relates to extendable and retractable sections of a recreational vehicle which are made up of folding side wall panels, folding end wall panel, and a folding roof section, all of which are folded into a stack and the stack retracted. The purpose is to allow for more interior living space in a recreational vehicle, usually in the form of bunks or sleeping quarters.

2. Description of the Prior Art

The concept of extendable sections of a recreational vehicle is not broadly new but generally these extensions are in the form of canvas side walls and canvas roof sections. As such, they lack the stability, appearance and comfort of solid side wall panels. Solid side wall panels are superior acoustically and functionally to the mere flexible fabric type side walls and roof panels and it has long been the aim of the recreational vehicle industry to provide a practical extension apparatus and method for solid side wall, end wall and roof sections which could be readily retracted into the confines of the recreational vehicle during transport and then extended to form a stable bunk section for use once the recreational vehicle is at location.

The idea of having solid or hard panel fold out bunk sections has been attempt and an illustration of this is found in Knudsen U.S. Pat No. 3,632,153 "HARD PANEL FOLD OUT BUNK SHELTER" issued Jan. 4, 1972. In this patent, unlike the present invention, the side wall panels are hinged midway of their height so that they fold inwardly one section over the other. This is an arrangement which is less preferred than the present invention in which the panels are hinged at their side edges only. Throughout their outline, the solid panels are not obstructed by hinges which might otherwise weaken the structure and add to the cost of construction.

SUMMARY OF THE INVENTION

The improved apparatus and process of the present invention lies in the ability to fold inwardly upon themselves solid side wall panels, a solid end wall panel and a solid inclined roof structure which can couple and decouple with a vertically raisable and lowerable horizontal roof structure. The combination of infolded, stacked, solid panels are contained in a compact envelope and the stack is relatively easily retractable on side rails to fit within the confines of the recreational vehicle where they are stored and transported. The vertically movable roof is then lowered to protect the interior of the recreational vehicle and completely enclose the retracted stacked panels.

The prior art has long sought for an effective solution to the problem of providing a combination of solid wall panels, including side panel and end wall panel together with a solid collapsible roof panel. The problem lies mainly in the ability to provide effective articulating connections permitting the infolding without interference of one panel from the other and also how to collapse such wall panels inwardly in a relatively easy manner without causing them to be injured because of falling from their own weight from an upright position to a folded horizontal position. The value of the present invention lies in the ability to provide an effective answer to these problems in a relatively inexpensive and unique arrangement of articulated constructions.

Another feature of the present invention is that the side wall panels, end wall panel and inclined roof panel are retractable on side rails fitting slidably within companion rails of the recreational vehicle so that the entirety of the folded panels are readily telescoped inwardly within the outline of the recreational vehicle so as not to contribute any additional length or dimension to the recreational vehicle while it is in transit. The vertically raisable roof section of the recreational vehicle is then lowered and forms an effective cover over the entire outline of the vehicle shielding and protecting the inwardly collapsed extension when it is desired to transport the recreational vehicle.

Another important feature of the present invention is the unique combination sliding and hinged connection which is formed between the end wall panel and the roof construction, permitting the roof construction to overlie the end wall and at the same time permitting the roof panel to be articulated on the end wall panel so that it can be pivoted upwardly to become latched with the raised permanent roof.

This coacting linkage and hinge combination contributes to the formation of panels which in one position are stackable compactly one over the other, and from that condition can be raised in a unique sequence so that the roof structure, end panel and side panels are sequentially raised and all panels then fitted together to make an enclosure which is an extension of the recreational vehicle. The enclosure contributes to the living space for the recreational vehicle. To the extent that living space can be enlarged without adding materially to the weight or volumetric geometry of the recreational vehicle, this represents a substantial improvement in the state of the art.

An important concept of the present invention is that the retractable and extendable combination of panels is relatively rigid when raised. This forms an important improvement, both acoustically and thermally, and from the sense of security, over the prior art system of providing an extendable bunk section in which the side walls are made of flexible canvas or the like. The idea of substituting fabric panels, which are relatively easy to collapse and erect, with solid side wall panels, proved difficult for the art to overcome, but the present invention achieves just that.

Overall, the present invention proposes effective use of solid side wall, end wall, and roof panels which can be readily collapsed to a series of horizontal panels, one overlying the other. Then the same panels can be expanded and raised to provide an enclosure of water tight and draft free interior greatly expanding the usable space of the recreational vehicle.

DESCRIPTION OF THE PREFERRED EMBODIMENT

Figure 5:
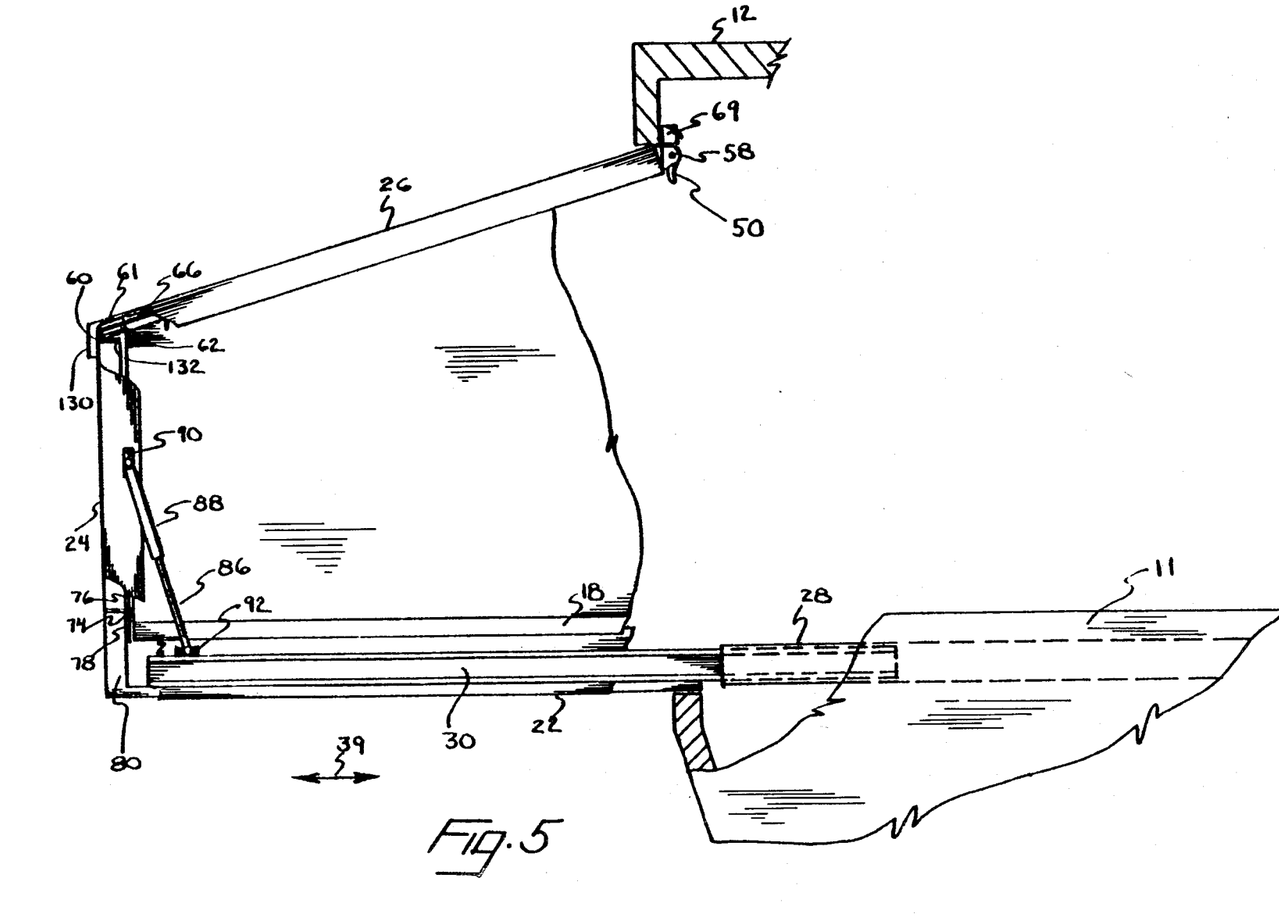
FIG. 5 is a section view taken on Line 5—5 of FIG. 2 and with the side panels folded down.
Figure 7:
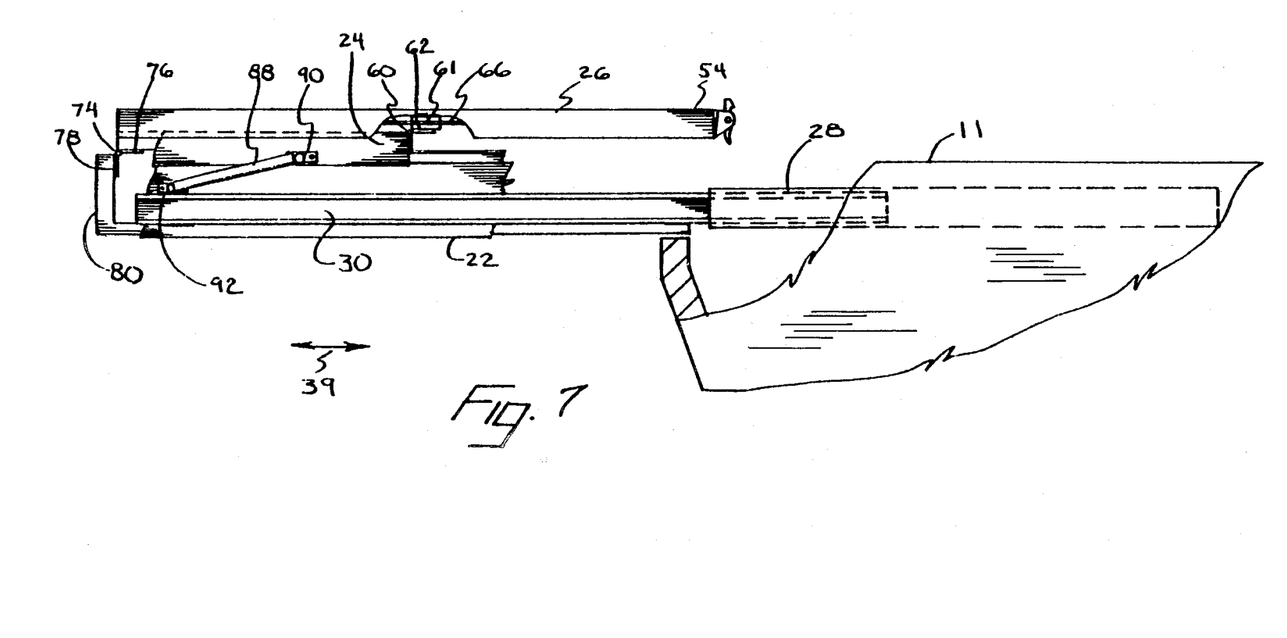
FIG. 7 illustrates the fully stacked position of the side wall panels, end wall panel and roof panel just prior to retracting the stack of panels.

Referring now to the drawings, there is illustrated a recreational vehicle designated generally by reference numeral 10 and having a vertically raisable and lowerable roof 12. At the ends 13 and 14 of the vehicle are extendable and retractable bunk sections referred to generally by reference numerals 16 and 17. By reference to "bunk sections" it should be understood that the additional enclosed space can be employed for bunks or for any other convenient application, it being understood, however, that the most common application is for sleeping quarters since a substantial overhead section is not required for sleeping quarters, and also because the interior of these sections can be readily adapted with mattress, pillow and the like. The extendable bunk section consists of two side wall panels 18, 20, a base panel 22, an end wall panel 24 and an inclined roof panel 26. The extensions 16, 17 are mounted for slidable movement on a track 28 secured to the inner surface 29 of the sides 11 of the vehicle 10. Within each track 28 is a side rail 30 which fits telescopically within the track 28 and is secured by bolts 34 to the side flange 38 of the base 22 through nut 36 and spacer 32. Thus, all of the panels, being carried by the base 22, are in turn carried through the side rail 30 and the track 28 for slidable movement in the direction of the double arrow-headed line indicated by reference numeral 39 (FIGS. 5 and 7).

Each side wall panel 18, 20 is mounted through strap hinges 40 to the side flange 38 of base 22 and permitting the side wall panels 18, 20 to be folded inwardly against the base panel 22. This is indicated generally with respect to side wall 18 by reference numeral 44 (FIG. 3) which indicates by the arrow the direction of initial inward hinged movement. Once these two side walls 18, 20 are swung from vertical to horizontal position, the rest of the steps of bringing the panels downwardly to a stored position can progress. In the process of collapsing the bunk section, the end panel 24 and inclined roof panel 26 are lowered, these steps being traced commencing in FIG. 5 through FIG. 6 and then to FIG. 7. Referring first to FIG. 5, panel 24 is pivoted on 74, this being a strap hinge having strap 76 secured to panel 24 and strap 78 attached to upright section 80 of the base panel 22. When the end wall panel 24 is pivoted in the direction of the arrow an air cylinder 88 having articulated connection 90 with the end wall panel and connection 92 with the base panel 22 will cause the piston rod 86 to telescope within cylinder 88, thus cushioning the downward pivoting movement described. The stored energy is then available for assisting in raising the panel 24 and attached roof panel 26.

Figures 6, 6A:
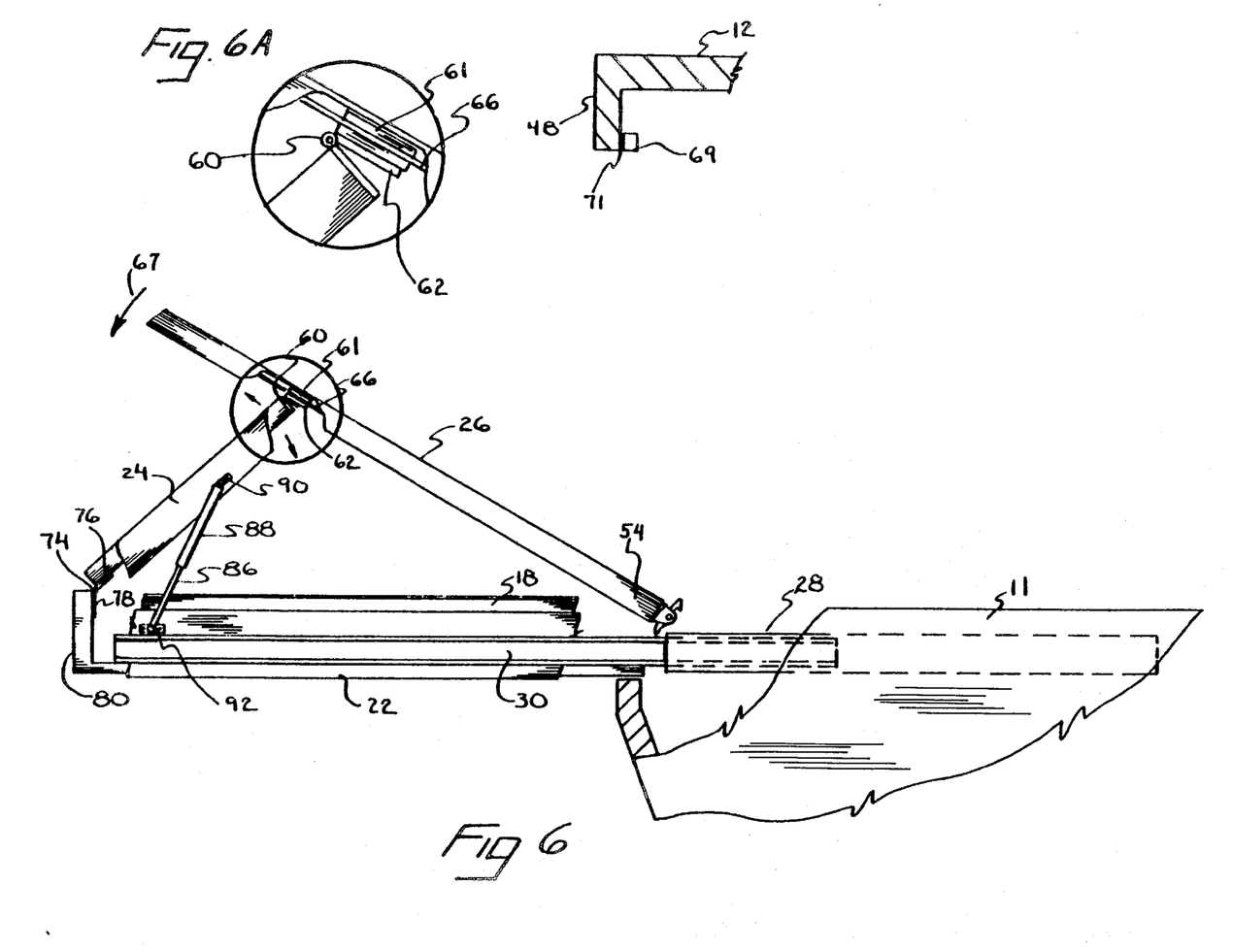
FIG. 6 illustrates the next phase of collapsing from that of FIG. 5 by first unlatching the inclined roof section of the extension pivoting it downwardly, with the pivoted end panel sliding on its connection with the roof panel as the end panel is pivoted in a downwardly direction.
FIG. 6A is a detail enlarged view of the circled portion in FIG. 6.

Between the panel 24 and roof panel 26 is a compound pivoting and sliding connection made up of a hinge 60 and two slider plates 61, 62 which slide along a guide 66 formed in the interior surface of the roof panel 26 (FIG. 6A). This enables the compound pivot-and-slide connection to travel along the length of the roof panel 26 in the manner shown in FIG. 6 until the roof panel 26 can pivot in the direction of the arrow 67 (FIG. 6) and wholly overlie panel 24 (FIG. 7). Before commencing the folding action of the end wall panel 24 and roof panel 26 the roof panel, at its end 54 is decoupled from the vertically raisable roof section 12. This is accomplished by depressing a finger-operated actuator 50 and causing the latch 58 to rotate about 52 detaching the latch 58 from the keeper 69 which is mounted at 71 on downwardly depending flange 48 of the roof 12. When the inclined roof panel 26 is mechanically secured to the raisable roof section 12 the panels 18, 20, base panel 22, end wall panel 24 and the inclined roof panel 26 are held rigidly in an upright position. Once the panels are stacked in the condition shown in FIG. 7, they are movable to the right as indicated by the double arrow headed Line 39 (FIG. 7) with the base panel 22 carrying the load of folded panels. The base panel with its rail connection in the tracks 28 enables a telescoping action, bringing the stack of panels from the position shown in FIG. 7 to that of FIG. 8 at which time they are wholly within the confines of the vehicle 10 and the vertically raisable roof 12 is lowered in the direction of the arrow 94. The roof 12 together with its depending flange 48 encloses the folded stack of panels which are brought within the confines of the vehicle.

As stated previously, the enclosure formed by the panels is both water tight and relatively draft free. This is accomplished by metal cladding the edges of the panels and where the edges of the panels intersect, the intersections are protectively covered with seals or overlapping metal covering. Thus, referring to FIGS. 3 and 4, the bottom of the side wall panels 18, 20 are clad with metal shielding 116, a portion of the shielding overlapping shielding 118 on the base panel 22. At the upper end of the panels 18, 20 the uppermost end 100 forms an interference sealing fit with the opposing surface 102 of the roof panel 26, and a box shaped metal extrusion with an interior seal 108 and flanges 110, 112 presses against the edge of roof panel 26 and insures a water tight seal when the upper edge of roof panel 18 is force-fitted against 102. Depending flange 114 of extrusion defines the limit of pivotal movement of the roof panels 18, 20 on hinges 40 and also by reason of the overlap precludes any rain from penetrating through the interference fit of side wall panels with the roof panel.

Figure 3:
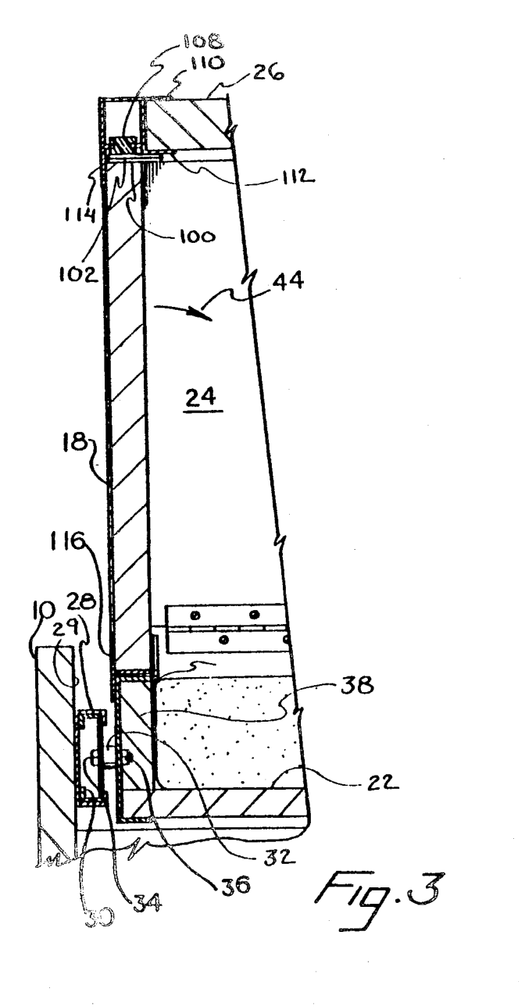
FIG. 3 is a section view taken on Line 3—3 of FIG. 2 and illustrating the side wall panel in the full upright position.
Figure 4:
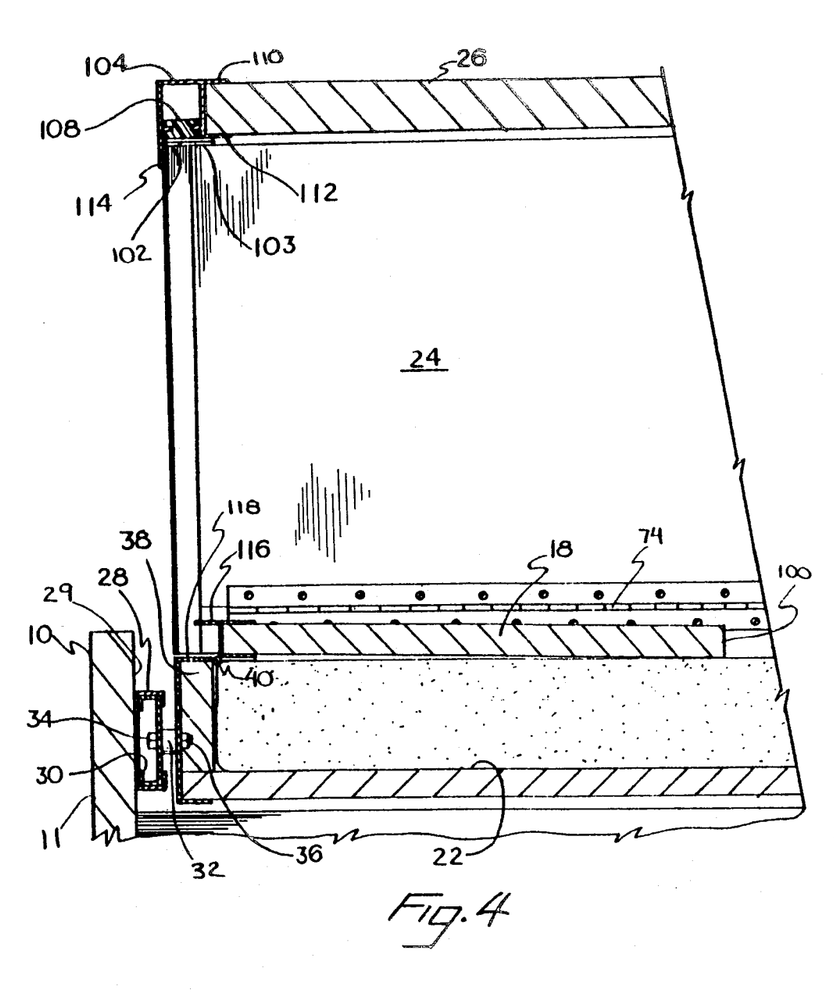
FIG. 4 illustrates how retraction of the extendable bunk compartment is initiated by first folding inwardly the side wall panels preparatory to the later sequential collapsing steps.

It should be noted that the hinge connection 74 between the end panel and the base, is located at a level which is above the hinge connection 40 with the side wall panels (FIGS. 3,4). Thus, the side wall panels pivot inwardly, to overlie the base panel and the end panel 24 is hinged inwardly to overlie the two side panels and such hinged movement will in no way be interfered with by the previous infolding of the side wall panels.

Where each panel intersects an adjoining panel, the intersection is protected against intrusion of rain and air drafts, thus making the enclosure formed by the panels an ideal sleeping quarter. The interior of the sleeping quarter is acoustically quiet, there is a sure feeling of security offered by the solid side wall panels, and the occurence of draft is minimized. Additionally, the solid side wall panels are a much more effective thermal barrier than fabric panels and thus help to conserve body heat and the interior heat of the sleeping compartment.

OPERATION

In operation, the bunk enclosure is retracted fully within the recreation vehicle during transport of the recreational vehicle 10. Until the recreational vehicle reaches a point of use the extensions are normally retracted and are not subject to exposure during transport.

Figures 1, 2:
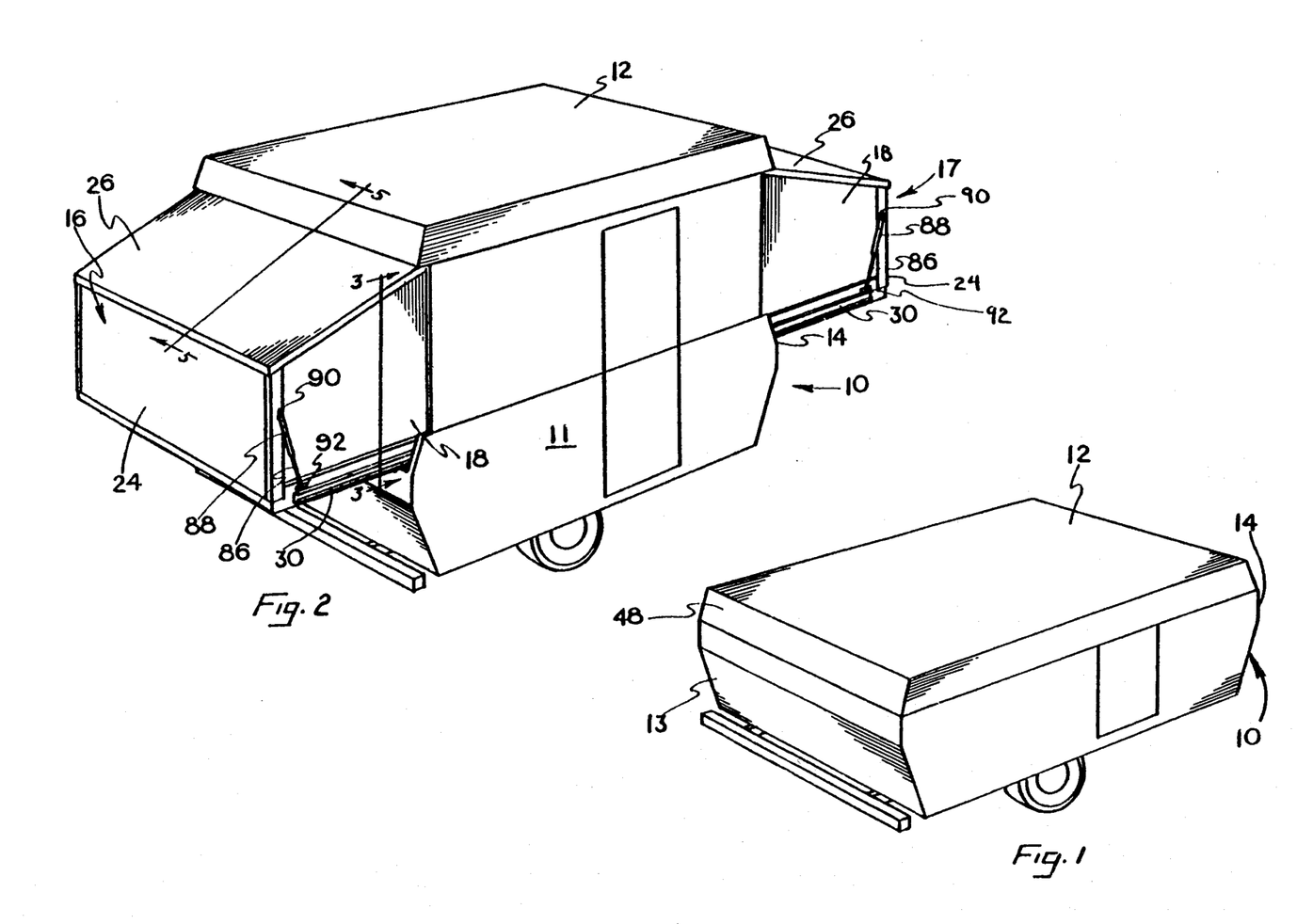
FIG. 1 is an isometric view of a recreational vehicle having the present invention incorporated therein.
FIG. 2 is the same vehicle as FIG. 1 but with the extension fully projected from the vehicle and the sides raised.
Figure 8:
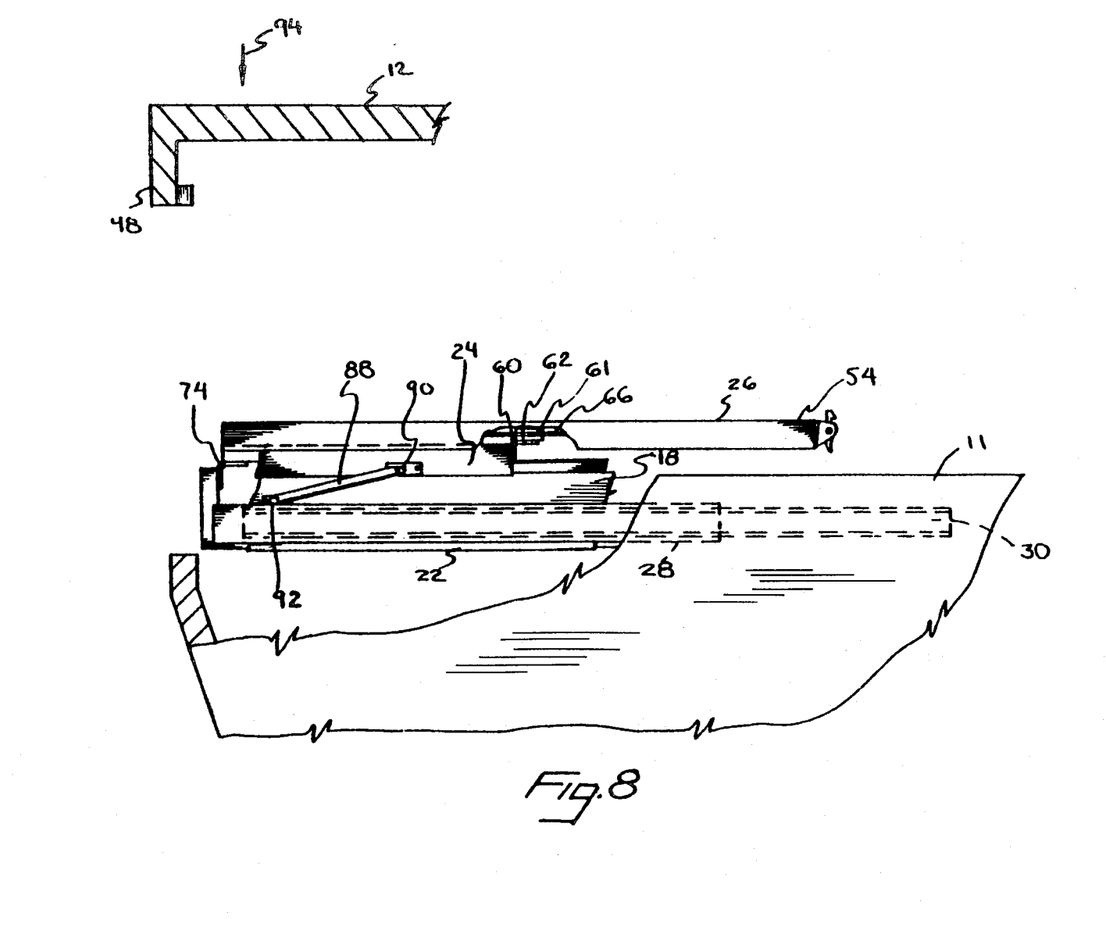
FIG. 8 illustrates the fully retracted position of the panels and with the vertically raisable/lowerable roof section being lowered to complete the transition from full extension to full retraction for vehicle transport.

Once the recreational vehicle 10 is in place and it is desired to extend the bunk sections, the roof section 12 is vertically raised from the position shown in FIG. 1 to that of FIG. 2. Next, the stacked panels shown in FIG. 8 are extended from the position shown in FIG. 8 to that of FIG. 7, causing the base panel 22 which has attached to it an internal rail 30 (FIG. 3) to slide on external track 28 which is permanently attached to the interior side walls 11 of the recreational vehicle.

Once the panels are extended to the position shown in FIG. 7, the end wall panel 24 and roof panel 26 are raised by causing the end panel 24 to swing in a counter-clockwise direction about hinge 74 (note the progression FIGS. 7 to 6 to 5). The swinging movement of the end wall panel 24 brings it to an upright position. The compound hinge and sliding connection 60 between the end panel 24 and the roof panel 26 (FIGS. 6, 6A) causes the hinge 60 to slide as well as pivot, the sliding occurring between the two slider plates and guide 66 until slider plates 61, 62 bottom against end flange 130 of the roof panel 26. There thus occurs a compound sliding and pivoting at end 132 of the end wall panel 24 and its connection with inclined roof panel 26. As the described upwardly pivoting movement of the end panel 24 and roof panel 26 occurs there is also an accompanying extension of the piston rod 86 within cylinder 88. The piston rod 86 is biased by the piston (not shown) within cylinder 88 so that the compressed air within 88 will assist raising both panel 24 and roof panel 26. Otherwise the weight of these two members would make it difficult to carry out these raising functions.

Once the end wall 24 is fully upright, the roof section 26 can be pivoted on hinge 60 to the extent necessary to cause the latch 58 to couple with the latch keeper 69 on the roof 12.

All that remains is to pivot the side wall panels 18, 20 from the position shown in FIG. 4 to that of FIGS. 2, 3 pivoting each of them about hinges 40 until the upper end of the wall panels 18, 20 form a snug interference fit with the undersurface 102 of the roof panel 26.

When the panels of the bunk sections are so extended, they form an enclosure completely surrounded by solid panels, including base 22 panel, two side wall panels 18, 20, end wall panel 24 and inclined roof panel 26. This combination of solid panels provides a weatherproof compartment ideally suited as a sleeping compartment. The overlapping sections, where each panel confronts an adjoining panel, guards against water leakage and air drafts, keeping the interior of the bunk compartment comfortable and undamaged by rain or other exterior elements.

The described raising and lowering can easily be accomplished without great manual effort by means of the assistance given by air spring 86, 88. Thus, any average strength adult can easily lower and raise the wall panels and roof panel within a matter of a few minutes. The recreational vehicle has, without contributing to its overall volume, a substantial enlargement of interior living space and this is an important consideration with recreational vehicles where overall volume is to be kept to a minimum during travel but at the point of use, maximum utilization of the interior of the vehicle is a design goal.

Both of these considerations are realized in the present invention and with utilization of solid panels for the bunk section. The solid panels contribute to a feeling of security and are much more effective for producing a quiet, weatherproof enclosure ideally suited as a bunk compartment.

INDUSTRIAL APPLICABILITY

The invention is useful for transportable recreational vehicles embodying extendable bunk sections.

CONCLUSION

Although the present invention has been illustrated and described in connection with a selected example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalents of the invention.

I claim:

1. A foldable and retractable extension for a recreational vehicle having a vertically raisable and lowerable roof structure comprising:
   (a) a base panel, two side wall panels, one on each side of said base panel, means for mounting said side panels between a vertical in-use position and a horizontal stored position, an inclined raisable roof extension detachably associated with said roof structure, an end wall panel hingedly mounted on said base panel for pivotal movement between a vertical in-use position and a horizontal stored position, means connecting said roof extension to said end wall panel for pivotal and sliding movement of the roof extension relative to the end wall panel during pivotal movement of the end wall panel between its said vertical in-use and horizontal stored positions, and means for providing sliding of said side wall panels and end wall panel when in their said respective horizontal stored positions and said base panel and roof extension within the outline of said recreational vehicle.

2. The foldable and retractable extension of claim 1 and including means for assisting the pivotal movement of said end wall panel into its vertical in-use position and raising of said roof extension and for cushioning the movement of the end wall panel into its said horizontal stored position and the lowering the roof extension therewith.

3. A process for selectively extending and retracting a foldable extension of a recreational vehicle comprising the steps of:
   (a) lowering and raising side wall panels of said extension by swinging said side wall panels between vertical and horizontal positions on hinge connections with a base panel;
(b) infolding and outfolding between horizontal and vertical positions an end wall panel having a hinge connection with said base panel and an articulated connection with a roof extension which is simultaneously shifted between an inclined raised position and lowered horizontal position, so as to bring both the end wall panel and roof extension to their respective horizontal positions overlying the infolded side wall panels;
(c) shifting said end wall panel both pivotally relative to and slidably along said roof extension to accommodate movement of the roof extension and end wall panel between their respective vertical and raised positions and horizontal positions; and
(d) sliding said side wall and wall panels and said roof extension when in their respective horizontal positions and said base panel inwardly of said recreational vehicle.

* * * * *